Figure 1:
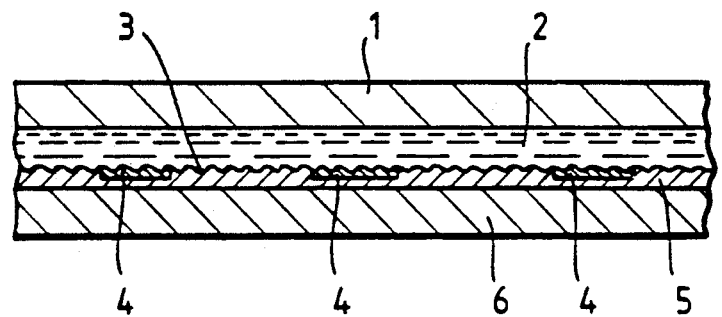

United States Patent [19]

Chatwin et al.

[11] Patent Number: 5,310,222
[45] Date of Patent: May 10, 1994

[54] OPTICAL DEVICE

[75] Inventors: Charles E. Chatwin, Horsham; Ralph Kay, Maidenhead; Martin C. Gomme, Hemel Hempstead; David Ezra, Wallingford, all of Great Britain

[73] Assignee: De La Rue Holographics Limited, London, England

[21] Appl. No.: 856,141
[22] PCT Filed: Oct. 19, 1990
[86] PCT No.: PCT/GB90/01613
  § 371 Date: Apr. 8, 1992
  § 102(e) Date: Apr. 8, 1992
[87] PCT Pub. No.: WO91/06925
  PCT Pub. Date: May 16, 1991

[30] Foreign Application Priority Data

Oct. 26, 1989 [GB] United Kingdom ............... 8924111

[51] Int. Cl.⁵ ............................................. B42D 15/00
[52] U.S. Cl. ..................................... 283/86; 283/109; 283/111; 359/2
[58] Field of Search .................. 283/86, 117, 109, 111; 359/2

[56] References Cited

U.S. PATENT DOCUMENTS

| | | |
|---|---|---|
| 3,235,395 | 2/1966 | Scharf . |
| 3,589,962 | 6/1971 | Bonjour . |
| 4,012,552 | 3/1977 | Watts . |
| 4,184,700 | 1/1980 | Greenaway . |
| 4,629,647 | 12/1986 | Sander . |
| 4,758,296 | 7/1988 | McGrew . |
| 4,816,322 | 3/1989 | Pickering . |
| 4,856,857 | 8/1989 | Takeuchi et al. . |
| 5,044,707 | 9/1991 | Mallik . |
| 5,083,850 | 1/1992 | Mallik et al. . |

FOREIGN PATENT DOCUMENTS

| | | |
|---|---|---|
| 0034392 | 8/1981 | European Pat. Off. . |
| 0130953A2 | 1/1985 | European Pat. Off. . |
| 0201323 | 11/1986 | European Pat. Off. . |
| 0202811 | 11/1986 | European Pat. Off. . |
| 0360970A1 | 4/1989 | European Pat. Off. . |
| 0328086 | 8/1989 | European Pat. Off. . |
| 0338378 | 10/1989 | European Pat. Off. . |
| 3422908A1 | 1/1986 | Fed. Rep. of Germany . |
| 3941257 | 12/1989 | Fed. Rep. of Germany . |
| WO88/05728 | 8/1988 | PCT Int'l Appl. . |
| WO88/09252 | 12/1988 | PCT Int'l Appl. . |
| WO89/03760 | 5/1989 | PCT Int'l Appl. . |
| WO90/09640 | 8/1990 | PCT Int'l Appl. . |
| 2119312 | 11/1983 | United Kingdom . |
| 2136352 | 9/1984 | United Kingdom . |
| 2211760 | 7/1989 | United Kingdom . |
| 2219248 | 12/1989 | United Kingdom . |

OTHER PUBLICATIONS

S. McGrew, "Countermeasures Against Hologram Counterfeiting", Optical Security Systems, International Symposium and Product Presentation for Optical Information Storage and Display, Zurich, Switzerland, Oct. 14–16, 1987.

Primary Examiner—Paul A. Bell
Attorney, Agent, or Firm—Oliff & Berridge

[57] ABSTRACT

An optical security device for use on a security article comprises a number of layers including an optically diffracting layer and an at least partially reflective layer which together generate a first image. A non-optically diffracting second image is provided within the device in association with the first image.

21 Claims, 2 Drawing Sheets

OPTICAL DEVICE

The invention relates to an optical device of the kind comprising a number of layers including an optically diffracting layer and an at least partially reflective layer which together generate a first image. Such devices are hereinafter referred to as of the kind described.

Optically diffracting devices cause incoming visible, infra red or ultra violet light to be diffracted. The devices most commonly encountered comprise an optically diffracting surface.

Such surfaces generally have a very fine microstructure which is subsequently metallised to add reflectivity so that the devices may be viewed by reflection. In addition to such surface relief devices it is also possible to obtain optical diffraction from volume hologram devices and the like.

Optically diffracting devices of the surface relief type may originate from the recording of laser bean interference patterns, or they may be created by other means known in the art.

Optically diffracting devices which are suitable for use in white light such as white light viewable holograms have predominated in the security marking industry. Such optically diffracting devices may more loosely be described as optically interfering devices in the sense that illuminating light is diffracted as distinct from merely absorbed or reflected.

Optical devices of the kind described find frequent use for decorative and brand identification purposes and as security devices on substrates such as transaction cards, credit cards and the like. Examples of typical optical devices include holograms and graphical diffractive patterns.

Typically, devices of the kind described possess a surface relief replica of a master profile. To make these, the fine line recording of an optically interfering pattern, usually stored on a nickel plate, is replicated on a plastic surface. The replicating processes generally used are moulding, embossing, casting or curing. Embossing of a thermoplastic polyer under conditions of elevated temperature and pressure is commonly employed as described for example in W089/03760. Further examples are described in EP-A-0328086 and in "Countermeasures Against Hologram Counterfeiting" by S. McGrew, International Symposium and Product Presentation for Optical Information Storage and Display, Zurich, Switzerland, Oct. 14–16 1987.

WO 88/09252 discloses the making of such optical replicas by ultraviolet curing of a polymerisable monomer while in contact with an optically interfering surface. U.S. Pat. No. 4,758,296 describes a similar system.

Electron beam recording or curing means may alternatively be employed.

Once the optical surface is created it is then reflectively metallised, such as by the vapour deposition of a thin layer of aluminum or other metal. Alternatively a metallised thermoplastic layer may be embossed.

The result is that the embossed surface can be viewed through the thermoplastic layer and against the reflective metallised backing.

The metallised film may at this stage be used for decorative purposes such as wrapping film.

Commonly a further layer is coated onto the metal. This may be a protective lacquer which if the resultant device is to be used for security purposes may be of the same chemical type as the embossed layer.

For certain applications e.g. holographic label stock, adhesive is then applied. This may be a pressure sensitive adhesive, or heat activatable, hot melt or laminating adhesive or a laminating film.

For security purposes the strength of the adhesive will be chosen to be at least that of the device so that the device cannot be peeled from the substrate to which it is affixed without damage.

Commonly the layer into which the optical surface is cast is supported on a carrier. The carrier may be a temporary carrier, such as when the thermoplastic layer is applied to a wax release coating on a polyester film. The use of temporary carriers is common if the optical device is to be stamped onto, say, a credit card.

Alternatively the presence of a discrete release layer, say, of wax, may be avoided by using a polymeric layer which exhibits low adhesion to the carrier and is peelable therefrom. Such constructions are found in U.S. 3235395 and U.S. 3589962.

Although the use of these devices leads to a relatively secure product which is difficult to counterfeit, there is a need for even more secure devices to be made.

In accordance with one aspect of the present invention, in an optical device of the kind described, a non-optically diffracting, second image is provided within the device in association with the first image.

In this new arrangement, we have devised a device in which a non-optically diffracting image is contained within the structure of the device rather than simply being placed on the surface of the device where it may readily be removed.

The term "diffracting" is used to indicate that the path of incident light is changed by the active layer. This includes for example simple diffraction as well as more complex interference which may result in a viewable reconstructed image.

In accordance with a second aspect of the present invention, a method of constructing an optical device of the kind described comprises bonding the layers together, and is characterized by providing a non-optically diffracting, second image within the device in association with the first image.

Typically the association between the images will involve providing the second image over the first or in register with the first so that there is at least partial overlap.

Usually the second image will be provided prior to bonding the layers together although an image could be developed or placed after bonding, eg by laser imaging. Commonly the second image will be applied to the surface of a surface relief optical structure prior to the metallisation.

The second images which may be provided include security information such as security printed indicia which take the form of lines, line segments, dots, letters, numbers, characters, logos, guilloches and other design elements. Bar codes and registration marks may also be included. These indicia may be printed by lithography, intaglio, gravure, flexography, screen or letterpress or a combination, with a single colour or colour combinations including blended ink "rainbow" printing—printed design or decorative patterns.

A visual image is typically provided, viewable or photometrically detectable from the same side as the optical effect, although the use of invisible materials which are detectable by use of ultraviolet and infrared incident radiation is also envisaged.

This invention is mainly aimed at visual markings including coloured inks (including black and white), metallic inks, coloured metallic inks, photochromic inks, thermochromic inks, magnetic inks, fluorescing or phosphorescing inks although invisible fluorescent ink printings and the like may be used. The invention will be described in the context of security images but other applications such as for tamperproof brand identification, for security tapes (see GB-A-2211760), and for general decorative effects should not be excluded.

The advantage of this invention is that attempts to interfere with or reproduce the device are made very much more difficult because the image will be carried within the device, thus making the device of monolithic construction.

The second images may be provided in a variety of ways. Since the second image will typically be provided on one of the layers which will usually be a plastics material, methods suitable for imaging onto plastics are preferred. These include:

gravure, letterpress, lithographic, screen or flexographic printing; impact printing, thermographic, laser induced thermographic, laser engraving, electrophotographic toner transfer, thermal (dye) transfer including laser induced thermal transfer and thermal matrix induced thermal transfer, ink-jet, ink bubble jet or other imaging means including other physically and chemically induced effects. Preferably offset lithographic or electronic printing means are used.

The electronic imaging methods include laser induced imaging, thermally induced imaging, electrophotographic transfer and ink jet imaging.

Electronic laser imaging equipment for metal removal imaging and suitable for use in the invention is described in EP-A-202811.

Electronically drivable thermal printing heads containing a number of individually heatable elements are supplied by Fujitsu and TDK.

The methods of imaging may involve thermal or laser induced dye or pigment transfer, dye diffusion transfer, imaging of colour generating or colour removing microcapsules contained within the strip.

Laser or thermally induced dye transfer followed by thermal diffusion into the layer may be employed so that the dye diffuses through to a security printed layer. This allows dyes conveniently to be applied by electronic means from the finished exterior, yet results in a secure structure.

In one particularly preferred arrangement the optical device is provided on a security substrate, the second image relating to the security substrate.

This arrangement is particularly advantageous in incorporating an image such as a serial number or other characteristic feature within the optical device itself enabling mass produced but individualised optical devices such as holograms to be generated.

Typical (second) images will be selected from one or more of security item information such as a serial number uniquely identifying the optical device or a batch or family, or validity date information;

individualising information for individual members or groups of animate or inanimate objects, including personal information relative to—the prospective holder of an article such as name, address, identification number, account number, portrait or fingerprint;—or to a series of holders;

issuing agency information including the issuing agency's name, address or logo.

The individual images or markings allow a series of otherwise identical holograms to be individually numbered. Individual markings may be employed to mark identical members of a group of holograms so as to enable identification of the group rather than the individual.

The markings may be serial numbers or numbers which are derived by encryption.

The devices for use in this invention may be numbered by any of the methods described above.

Electronic printing means allow more flexibility in the ability to change numbers than conventional printing where plates have to be made in advance.

Letterpress printing, for example through the use of serial numbering boxes supplied by Lethaby Numbering Systems Ltd. and mounted onto the embossing machine also proves advantageous.

Electronic imaging methods allow individualising, such as personalising, information to be added prior to issue. Doing this at the time of manufacture makes fraudulent alteration difficult. The methods of imaging may involve thermal or laser induced dye transfer, dye diffusion transfer, or imaging of colour generating or colour removing microcapsules contained within the strip.

Laser or thermally induced dye transfer followed by thermal diffusion into the layer may be employed so that the dye diffuses through the security printed layer. This has the advantage that the holograms may be completely manufactured and if necessary adhered to the security substrate prior to numbering.

Methods of electronic dye transfer printing are disclosed in WO90-09640. Preferably the protective layer is of the same polymer as the layer into which the fine line pattern is placed so as to make counterfeiting and fraudulent alteration more difficult.

In practice most of the markings will be placed onto the optical surface. Thus for example on the optical embossing machine there may be mounted electronic marking equipment such as an ink jet printer which will allow marking at the time of embossing and in register. Typically, registration tolerances better than 1.0 mm are required, preferably less than 0.5 mm and most preferably less than 0.25 mm.

A series of individually numbered holographic labels may be made as follows. A multiple holographic relief pattern is embossed into a thermoplastic layer in the manner described. To each holographic profile, a number differing from the previous number by one unit, is printed using a security serial numbering box with letterpress ink. After aluminisation and application of adhesive, the sheet is die cut to form a series of numbered holographic labels. The labels may be adhered to security documents or plastic cards in the conventional manner.

The imaging materials may be opaque, translucent or transparent and will either be dry or dry quickly on the surface. Photocurable inks may also be used.

The imaging material will preferably be visible at all times, although colourless ultraviolet and infrared absorbing inks may be used, as may visible inks, for authentication purposes.

The image may be created by selectively destroying the fine line embossing pattern by application of pressure, such as by applying hard faced metallic number shapes from a numbering box. This leaves a flat, non interfering, metallic surface.

The structure of the optical device itself may take any conventional form. Typically, the optically active layer is embossed with a diffractive or similar pattern and is then coated with a reflective, metallised layer.

Surface relief optical devices which may be employed have a fine line optically diffracting coating which has been imparted onto the surface of a transparent layer. After imaging the three dimensional surface will normally next be metallised, for example with vapour deposited aluminium. Generally only one metal will be applied but it is quite feasible to apply more, for example to give different reflecting colours. The extent of metal coverage must be sufficient for the device to give an optically diffracting effect but the metallisation may be partial, that is very thin and appearing transparent or selectively deposited, such as in a half-tone dot pattern which may also be transparent to an extent.

There are various types of devices which operate on this principle and they enjoy increasing use for security item protection. Examples of such surface relief devices are holograms including white light viewable rainbow holograms and stereoholograms, kinegrams, kinoforms, graphical diffractive devices including computer generated diffractive graphical devices, of the two dimensional appearance (ie flat) and three dimensional (ie spatial) types, diffraction gratings including linear diffraction gratings, circular and other geometric diffraction gratings, and multiples, composites and combinations thereof.

The optical devices may be used for visual identification or machine verification as appropriate.

Thus the embossed structure may be printed with security indicia in a number of colours and then may be printed with a background rainbow printing covering a substantial area of the printing prior to metallisation. This allows the printed indicia to be viewed both against the reflective metal and the background printing.

Although the second image is preferably provided at the optical plane (usually the interface between an embossed layer and a reflective, metallic layer), the second image could also be provided at the interface between any other pair of layers in the device, or within a viewable layer.

The at least partially reflective layer is preferably provided by metallising the optically active layer and this can be achieved by vapour deposition of metals under vacuum. Aluminium is frequently used but other metals such as chromium, copper, tin, gold, silver and nickel may be transferred. Multiple layers could be applied.

The optically diffracting layer and any additional layers through which the second image is viewed will preferably comprise transparent plastics materials selected from polyesters including biaxially orientated polyethylene terephthalate, polyvinyl chloride and co-polymers especially with polyvinyl acetate, polycarbonates, polyacrylates, polymethacrylates, and the like. The surface of the optically diffracting layer or film may itself be embossed if its properties allow, but more commonly it will bear a coating of an embossable polymer. The surface relief pattern may be formed by pressure, more commonly by heat and pressure. Alternatively a coating may be used which can be cured while in contact with a master metallic replica of the surface, such as the ultraviolet curable method described in WO 88/09252.

This completed film may be used on its own as a security or decorative feature and may for example be used in the form of sheets, tape, ribbon, threads (such as for security documents), filaments, planchettes and the like. Imaged optical devices may be used in security transfer tapes such as described in British Patent Application No. 9011457.0.

One advantage of providing the second image at the interface between the optically diffracting layer and the reflective layer, particularly in the case of a hologram, is that it is possible to obscure a large portion of the embossed area leaving only a small portion of holographic surface viewable. This provides a unique way of incorporating a hologram into a security article; the integral construction is much more secure than an affixed holographic label. The printing which hides the hologram may comprise security indicia and sometimes it may be further printed to add personalising or security markings such as in an identity card.

In the preferred arrangement, the optical device is adhered to the surface of the substrate, for example security item by use of an adhesive composition which may be applied initially to the device or alternatively to the surface of the substrate. The adhesive may be pressure sensitive (in which case a release layer may be needed to allow transport), or a heat activatable adhesive including a hot melt adhesive composition. Heat activatable adhesives are useful for hot stamping. The adhesive should exhibit good adhesion to the substrate and the device and may be curable. The adhesive may also be stronger than the device so that any attempt to remove the device intact would result in the device being irreversibly damaged. Curable adhesives may be employed, including photocurable adhesives. Adhesives for use with such devices are described in the prior art.

Alternatively, adhesive could be provided on selected areas of a substrate so that the device only adheres in those areas in the shape of the adhesive.

If the device contains a polymeric film forming coating on the metallised layer the polymeric film may be itself heat sealed to the substrate provided that the pressure used is sufficiently low not to damage the optical relief structure.

While the invention has generally been described with reference to printing on the embossment, an optical relief structure which contains markings within its structure would possess added security. Thus in a multiple layer structure the markings may be from a dye which is diffused into the plastic or the markings may be placed between two layers which are not the embossing and metallic layers. Alternatively, the completely or partially reflecting layer may be imagewise formed.

Some examples of optical devices according to the invention will now be described with reference to the accompanying drawings, in which FIGS. 1-5 are cross-sections through five examples of optical devices.

The device shown in FIG. 1 comprises a transparent plastics support 1 bearing a coating 2 into which an optically diffracting pattern 3 has been embossed in a known manner. Printing ink images 4 are placed on the surface profile and a layer of reflective metal 5 is applied by vapour deposition. The thin metallic layer 5 is then covered with a protective coating of a thermoplastic polymer 6.

The device is viewed through the plastics support 1 which is transparent thus enabling the hologram or other diffraction pattern defined by the embossed pattern 3 and metallisation 5 to be viewed. In addition, the image 4 is seen.

In use, the device shown in FIG. 1 is adhered to a substrate, such as a plastics sheet by adhesive (not shown).

Figure 2:
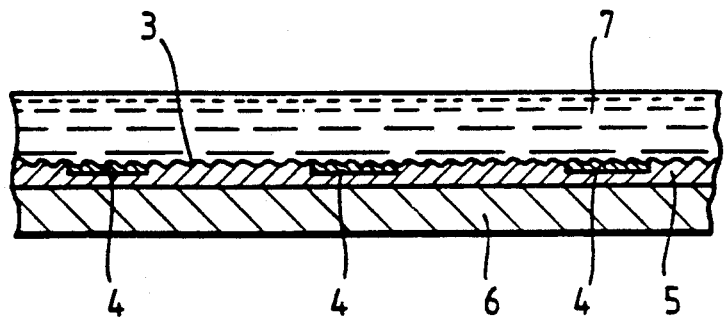

FIG. 2 illustrates a similar construction to that of FIG. 1 except that the thermoplastic layer 7 is self supporting thus enabling the plastics support 1 to be omitted.

Figure 3:
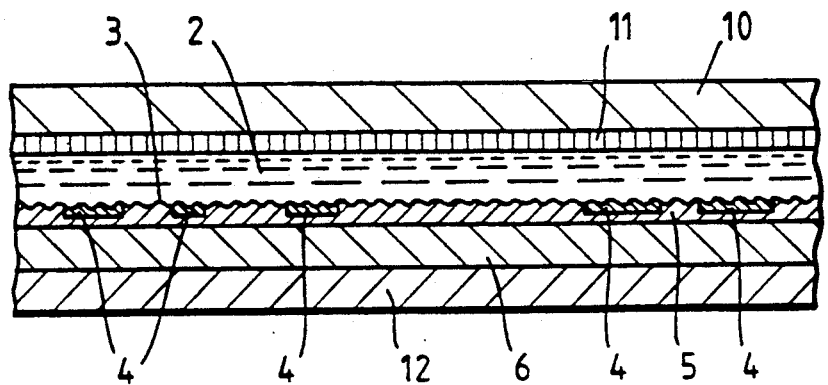

FIG. 3 illustrates a hot stamping film. A carrier sheet 10 such as a polyester film has a thin wax release coating 11. A thermoplastic layer 2, such as a polyacrylate, is applied to the wax layer 11 and is embossed under conditions of elevated heat and pressure against a nickel shim which has a diffractive pattern in relief on its surface thereby forming a surface profile 3 in the embossed layer 2.

An image 4 is lithographically printed in the form of security indicia onto the layer 2 and the printed surface is then made reflective by the vapour deposition of a thin layer of aluminium 5.

A protective, thermoplastic polymer layer 6 is applied over the metallisation 5 and finally a hot melt adhesive coating 12 is applied. In an alternative embodiment adhesive could be applied selectively to a substrate instead. The film of FIG. 3 (without adhesive) is then applied to the substrate, the adhesive is activated, and the carrier film 10 peeled away so that the layers 2, 5, and 6, remain on the substrate where adhesive is present and are removed elsewhere.

Figure 4:
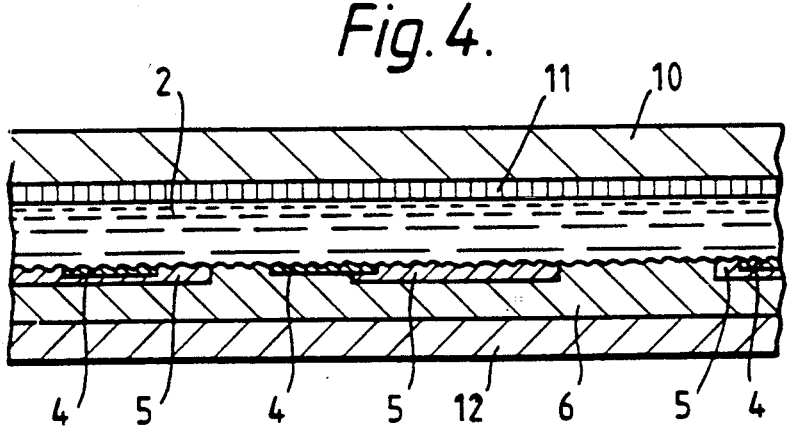

FIG. 4 is similar to that in FIG. 3 except that the metallisation 5 is partial.

Figure 5:
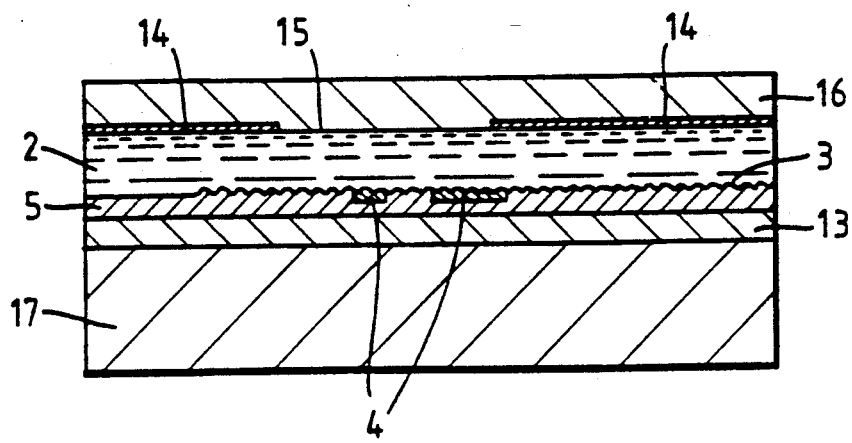

FIG. 5 represents a plastic identity card. This has a thermoplastic layer 2 having optical embossings 3, printing 4, metallisation 5 and a fusion laminatable thermoplastic coating 13. Further security printing 14 is applied which effectively occludes most of the optical surface. A window 15 is left through which the optical pattern and associated printing can be viewed. Further printing (not shown) may be applied over the obscuring printing 14. This material is then laminated between a transparent protective layer 16 and a plastic substrate 17, to form a security card.

Security information allows an article to be regarded as genuine, thereby giving the article value beyond that of its constituents. The security information may be presented in alphanumeric or shape form if necessary encoded in some form. While this information may be placed in the article by printing, imaging or other marking means using conventional methods, the printing, imaging or marking may be done in a secure manner such as by using special inks which impede counterfeiting and forgery and allow any such attempts to be defected, such that genuine articles are regarded as authentic.

We claim:

1. An optical security device for use on a security article, the device comprising a number of layers including an optically diffracting layer including an embossed layer and an at least partially reflective layer which together generate a first image; and a non-optically diffracting second image defined within the device in association with said first image, wherein said second image is provided at the interface between the embossed layer and said at least partially reflective layer.

2. A device according to claim 1, wherein said second image comprises security information.

3. A device according to claim 2, wherein said second image comprises security indicia selected from the group consisting of lines, line segments, dots, letters, number characters, logos, guilloches, and bar codes.

4. A device according to claim 2, wherein said second image comprises security item information selected from the group consisting of a serial number uniquely identifying at least one optical device or validity date information.

5. A device according to claim 1, wherein said second image comprises individualizing information including personal information relative to a prospective holder of an article, said personal information selected from the group consisting of a name, an address, an identification number, an account number, a portrait or a fingerprint.

6. A device according to claim 1, wherein said second image comprises issuing agency information including the issuing agency's name, address or logo.

7. A device according to claim 1, wherein said second image is normally invisible under white light radiation.

8. A device according to claim 1, wherein said second image is formed by a dye.

9. A device according to claim 1, wherein the second image is provided by an ink selected from the group consisting of colored inks, metallic inks, colored metallic inks, photochromic inks, thermochromic inks, magnetic inks, fluorescing inks and phosphorescing inks.

10. A device according to claim 1, wherein said first image is selected from the group consisting of holograms, kinegrams, kinoforms, graphical diffractive devices, diffraction gratings, and combinations thereof.

11. A device according to claim 1, wherein said second image partially overlies said first image.

12. A security article carrying an optical security device according to claim 1.

13. A security article according to claim 12, the article comprising a transaction card or credit card.

14. A device according to claim 1, wherein said second image comprises individualizing information for a group, including personal information relative to a series of holders.

15. A device according to claim 1, wherein said second image is formed by an ink.

16. A hot stamping foil comprising a carrier layer and an optical security device releasably secured to said carrier layer, said security device comprising a number of layers including an optically diffracting layer including an embossed layer and an at least partially reflective layer which together generate a first image; and a non-optically diffracting second image defined within the device in association with said first image, wherein said second image is provided at an interface between the embossed layer and said at least partially reflective layer.

17. A method of constructing an optical security device for use on a security article, the device comprising a number of layers including an optically diffracting layer having an embossed layer and an at least partially reflective layer which together generate a first image, the method comprising bonding said layer together and providing a non-optically diffracting, second image within the device wherein said second image is provided at an interface between said embossed layer and said at least partially reflective layer.

18. A method according to claim 17, wherein said second image is provided prior to bonding said layers together.

19. A method according to claim 17, wherein said second image is printed onto one of said layers of the device by a method selected from the group consisting of gravure, letterpress, lithographic, screen or flexographic printing; impact printing, thermographic, laser induced thermographic, laser engraving, electrophotographic transfer, thermal transfer including laser induced thermal transfer and thermal matrix induced thermal transfer, ink-jet, and ink bubble jet printing.

20. A method according to claim 17, wherein said second image is provided by diffusing a dye through at least one of said layers of the device.

21. A device according to claim 17, wherein the second image is formed by selectively destroying the embossed pattern.

* * * * *